United States Patent [19]

Sanderson

[11] 4,299,700

[45] Nov. 10, 1981

[54] MAGNETIC WATER CONDITIONER

[76] Inventor: Charles H. Sanderson, 3717 Fritcha Ave., Fort Wayne, Ind. 46806

[21] Appl. No.: 121,646

[22] Filed: Feb. 14, 1980

Related U.S. Application Data

[63] Continuation of Ser. No. 18,736, Mar. 8, 1979, abandoned, which is a continuation-in-part of Ser. No. 798,854, May 20, 1977, Pat. No. 4,153,559.

[51] Int. Cl.$^3$ ............................................. B01D 35/06
[52] U.S. Cl. ................................................... 210/222
[58] Field of Search ....................... 29/516, 517, 510; 210/222, 223, 456; 55/3, 100; 209/223 R, 223 A, 232

[56] References Cited

U.S. PATENT DOCUMENTS

| | | | |
|---|---|---|---|
| 2,370,725 | 3/1945 | Gordon | 29/517 |
| 2,690,842 | 10/1954 | Spluvak | 210/222 X |
| 3,732,616 | 5/1973 | Masrrodonato et al. | 29/510 X |
| 3,951,807 | 4/1976 | Sanderson | 210/222 |
| 4,153,559 | 5/1979 | Sanderson | 210/222 |

Primary Examiner—Charles N. Hart
Assistant Examiner—David R. Sadowski
Attorney, Agent, or Firm—Gust, Irish, Jeffers & Hoffman

[57] ABSTRACT

A device for the magnetic treatment of water and other liquids, having a pair of concentric tubular casings which are spaced from each other so as to form an annular treatment chamber. The inner casing contains an elongated magnet having two or more longitudinally spaced poles, and the intermediate casing is made of a magnetic material which serves to concentrate the magnetic lines of force within the annular chamber. The inner casing is supported within the intermediate casing by means of elastic, non-magnetic sleeves which are positioned over opposite ends of the inner casing and compressed between it and the inner surface of the intermediate casing so that the treatment chamber is rendered fluid-tight. A pair of apertures are provided in the opposite ends of the inner casing to permit fluid to flow into and through the annular chamber. In order to prevent the magnet from shifting axially relative to the inner casing and to prevent the inner casing from shifting axially relative to the sleeves, the apertures are deformed inwardly and outwardly so as to form locking ears between the apertures and the magnet and sleeves, respectively. The ends of the inner casing are flared outwardly so as to prevent the sleeves from sliding off the inner casing and to impart additional compression to the sleeves.

7 Claims, 9 Drawing Figures

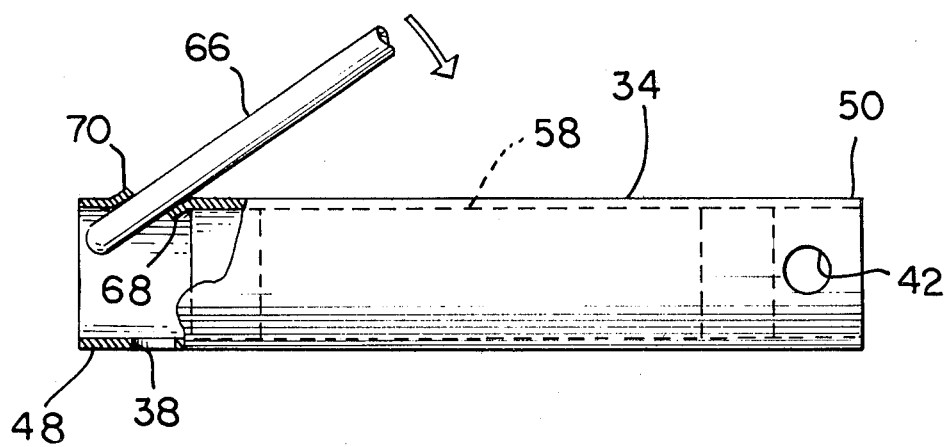
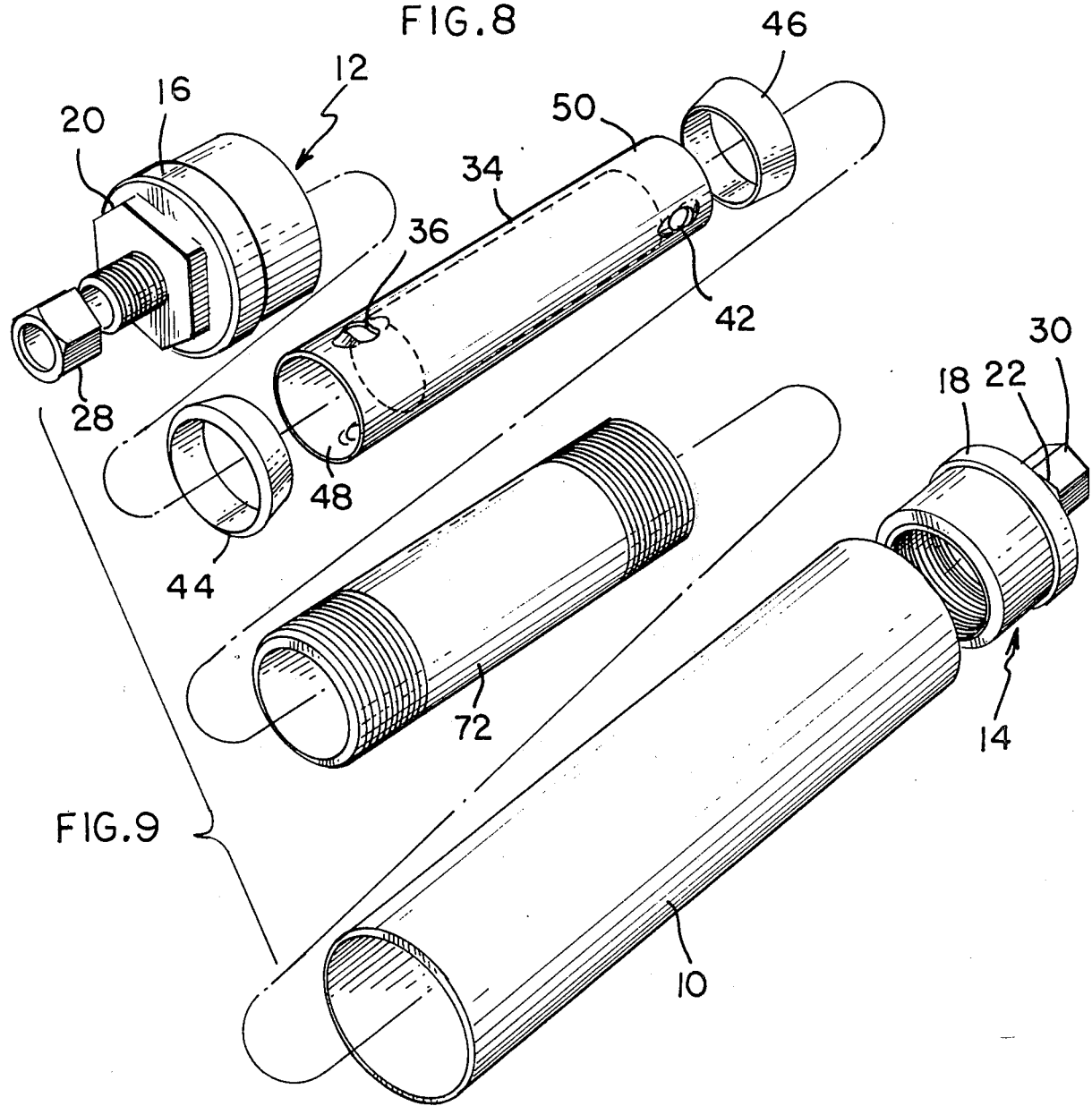

MAGNETIC WATER CONDITIONER

CROSS REFERENCE TO RELATED APPLICATION

This is a continuation of application Ser. No. 18,736, filed Mar. 8, 1979, now abandoned, which is a continuation-in-part of Ser. No. 798,854 filed May 20, 1977, now U.S. Pat. No. 4,153,559.

BACKGROUND OF THE INVENTION

The present invention relates to a device for the magnetic treatment of water to reduce the buildup of scale.

A problem which is quite prevalent in systems and apparatus which use large amounts of water, such as boilers, dishwashers, ice machines, and the like, is that of scale buildup on the surfaces which come into contact with the water. This is especially troublesome in areas where the water has a high mineral content so that it is necessary for the water to be "conditioned" either by chemical action or by magnetic water treatment devices of the general type to which the present invention relates.

One such magnetic treatment device is disclosed in U.S. Pat. No. 3,951,807 to Charles H. Sanderson and comprises an elongated magnet having a multiplicity of longitudinally spaced poles encased in a non-magnetic jacket and concentrically positioned within a galvanized outer casing made of a magnetic material, such as iron. The jacketed magnet is centered by means of a pair of stepped collars secured thereto which, in turn, are centered by means of a pair of layered inserts.

Another magnetic water treatment device, which is commercially available, comprises an outer casing of magnetic material, an intermediate casing made of plastic, and an elongated permanent magnet encased within a plastic jacket having helical vanes which support the magnet centrally within the intermediate casing. Non-magnetic end caps are threadedly secured to opposite ends of the intermediate casing and O-rings are compressed between flanges on the end caps and the outer casing.

Magnetic treatment devices generally of this type are well known and prevent the buildup of scale by causing the calcium and other minerals present in hard water to form, instead, a loose slurry which can be removed easily from the system by blowdown or flushing. In many applications, such as furnace humidifiers, for example, it is necessary that the device be contained within a fairly small housing, and for this reason, available space is at a premium. The effectiveness with which the water is treated depends on the intensity of the magnetic field within the treating chamber and the effective length of the chamber itself. Accordingly, it is desirable that the chamber be free of any obstructions which may occupy otherwise available treatment space, and for the water to be directed into and completely occupy the annular treatment chamber as quickly and in as short a distance as possible after it enters the device.

A further consideration is that the strength of the magnetic field produced by the magnet be confined solely to the annular treatment chamber so that all of the available flux will be utilized. An important factor in ensuring this situation is to completely magnetically isolate the magnet from the supporting structure and to complete the magnetic circuit by means of a ferrous casing which surrounds the magnet, and which is also magnetically insulated from its supporting structure and from the magnet.

In the aforementioned patent application Ser. No. 798,854, the magnet structure is disclosed as centrally supported within the ferrous casing by means of a pair of non-magnetic, elastic sleeves compressed between and in frictional engagement with the magnet structure and the ferrous casing at opposite ends thereof. Additionally, the magnet is frictionally retained within its jacket by a pair of plastic end caps which further insulate the magnet and also serves to prevent water from coming into contact with it thereby causing corrosion.

Although the frictional engagement between the inner casing and plastic end caps and between the inner casing and the elastic sleeves serves to hold the structure in proper position in normal use, a severe jolt to the unit, as by dropping it during shipping or installation, may cause the magnet to shift axially thereby partially or completely blocking one set of the apertures. Obviously, this would prevent proper flow of water through the device. Furthermore, it is possible for the inner casing to shift relative to one of the elastic sleeves, and this also would result in partial or complete blocking of one set of the apertures. Axial shifting of the magnet relative to the inner casing may also be caused by a severe water hammer occurring in the water supply system in which the device is connected.

SUMMARY OF THE INVENTION

The present invention constitutes an improvement to the water conditioner disclosed in the aforementioned application Ser. No. 798,854 filed May 20, 1977. The improvement comprises providing on the inner and outer surfaces of the inner casing projections which serve to prevent the magnet assembly from shifting axially within the inner casing, and to prevent the inner casing from shifting axially relative to the elastic sleeves. Since the elastic sleeves are locked in place by virtue of the flared ends of the inner casing, all of the elements of the device will be positively locked in their proper positions. The projections may be shaped so as to more effectively channel the water into and out of the treatment chamber.

Specifically, the present invention is a device for the treatment of water comprising an elongated tubular intermediate casing of magnetic material having an inner surface, an elongated magnet having opposite ends and at least two longitudinally spaced poles, an inner casing of non-magnetic material encasing the magnet, the inner casing including inner and outer surfaces extending longitudinally with respect thereto. The inner casing includes open tubular end portions extending beyond opposite ends of the magnet and is positioned longitudinally within the intermediate casing. Means are provided for supporting the inner casing within the intermediate casing and spacing the inner casing from the intermediate casing inner surface so as to form an annular chamber therebetween, said means for supporting comprises a pair of tapered elastic sleeves of non-magnetic material positioned over opposite ends of the inner casing between the inner casing outer surface and the intermediate casing inner surface. The ends of the inner casing are flared outwardly so as to tightly compress the sleeve between the flared ends of the inner casing and the inner surface of the intermediate casing, the sleeve being in tight frictional engagement with the intermediate and inner casings. At least one aperture is provided in each of the tubular end portions of the inner casing extending into the annular chamber. In order to prevent axial shifting of the inner casing relative to the magnet and sleeves, the inner and outer surfaces of the inner casing are provided with inwardly and outwardly projecting locking means, respectively, between the apertures and magnet and between the apertures and elastic sleeves. Fluid fittings are secured to opposite ends of the intermediate casing.

The magnetic water treatment device is manufactured by the following steps: providing an elongated bar magnet, attaching resilient end caps on opposite ends of the magnet, providing a tubular inner casing of non-magnetic material having opposite end portions with apertures therein and pressing the magnet and end caps longitudinally within the inner casing to a position between the apertures, the end caps being compressed between the magnet and inner casing so that the magnet is frictionally retained in the inner casing. Each of the apertures is deformed inwardly at the axial inner ends and deformed outwardly at the axial outer ends to form pairs of inwardly and outwardly projecting locking ears. The inner casing is inserted within a tubular intermediate casing of magnetic material and a pair of elastic sleeves, each having a tapered end, are wedged, tapered ends first, concentrically between the intermediate and inner casings at the opposite ends thereof so as to radially center the inner casing within the intermediate casing. The inwardly and outwardly projecting locking ears are adapted to limit relative axial movement between the inner casing and the magnet and between the elastic sleeves and inner casing, respectively. The ends of the inner casing are then flared outwardly to retain the sleeves on the inner casing.

It is an object of the present invention to provide a magnetic water treatment device wherein the magnet is magnetically insulated from the supporting structure, and is supported at opposite ends thereof so that the annular treatment chamber is substantially free of obstructions and maximum subjection of the flowing water to the magnetic field is achieved.

Another object of the present invention is providing magnetic water treatment device wherein soldering and welding are eliminated by virtue of the frictional engagement between the various elements.

Yet another object of the present invention is to provide a magnetic water treatment device wherein the various elements thereof are positively locked against axial shifting movement, thereby insuring proper operation of the device even though it may be subjected to trauma during shipping or installation.

Yet another object of the present invention is to provide a magnetic water treatment device which is relatively simple in construction and capable of being rapidly and efficiently manufactured.

These and other objects and features of the present invention will become more apparent from the detailed description considered together with the accompanying drawings.

BRIEF DESCRIPTION OF THE DRAWINGS

FIG. 8 is a side elevational view, partially in section, of the inner casing showing the manner in which the fluid apertures are deformed to provide the locking ears; and FIG. 9 is an exploded perspective view of the device.

DETAILED DESCRIPTION

Figures 1, 2, 3, 4, 5, 6, 7:
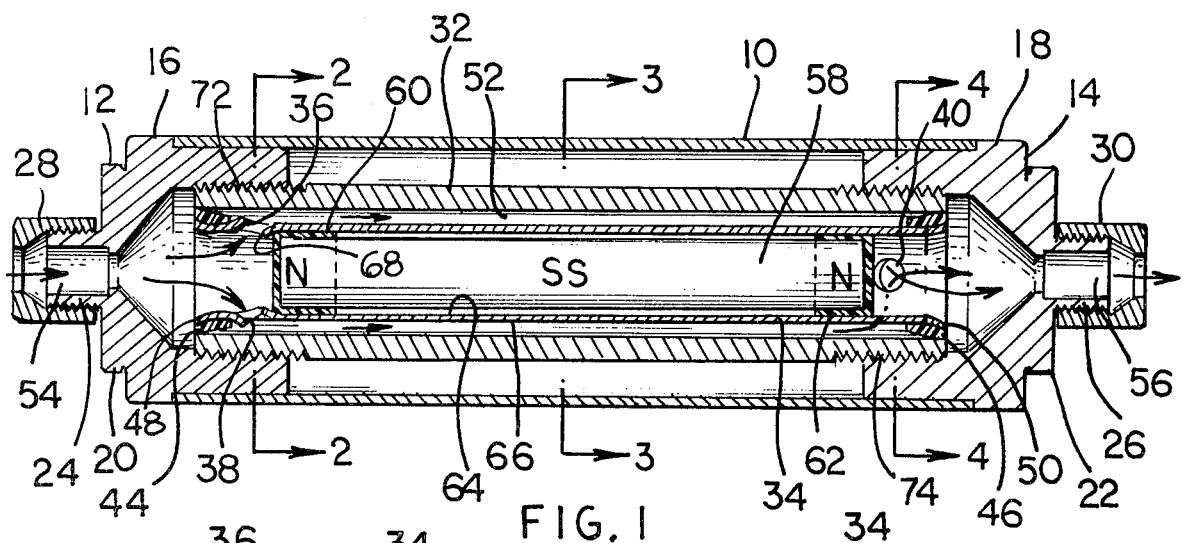
FIG. 1 is a longitudinal sectional view of the magnetic water conditioner according to the present invention.
FIG. 2 is a transverse sectional view taken along line 2—2 of FIG. 1 and viewed in the direction of the arrows.
FIG. 3 is a transverse sectional view taken along line 3—3 of FIG. 1 and viewed in the direction of the arrows.
FIG. 4 is a transverse sectional view taken along line 4—4 of FIG. 1 and viewed in the direction of the arrows.
FIG. 5 is an end view of the water treatment device shown in FIG. 1.
FIG. 6 is a perspective view of one of the elastic sleeves.
FIG. 7 is a sectional view taken along line 7—7 of FIG. 6 and viewed in the direction of the arrows.

Referring now to the drawings, the magnetic water conditioner according to the present invention comprises an outer casing 10 of a non-magnetic material, such as copper, and a pair of substantially identical fluid fittings 12 and 14, also of a non-magnetic material, such as brass. Fittings 12 and 14 are provided with flanges 16 and 18, respectively, which abut opposite ends of outer casing 10. Hexagonal heads 20 and 22 permit fittings 12 and 14 to be tightened by means of a standard wrench, and adapters 24 and 26 are threaded so as to receive standard compression fittings 28 and 30 for the purpose of connecting the device in a copper water line. Obviously, other types of fittings may be utilized depending on the environment for the device.

For purposes of the present description, "non-magnetic" means materials having a very low magnetic permeability and virtually no ferromagnetic characteristics, such as copper, brass, PVC, nylon and Delrin, for example. "Magnetic" materials are those exhibiting high magnetic permeability, such as iron and steel.

A tubular intermediate casing 32 of a ferromagnetic material having a high magnetic permeability, such as galvanized iron or steel, is threadedly connected to fittings 12 and 14. Casing 32 has an outer diameter less than the inner diameter of outer casing 10 and is uniformly spaced therefrom by fittings 12 and 14. Positioned within casing 32 is a tubular inner casing 34 of non-magnetic material, such as copper, which is open at both ends and has a pair of apertures 36, 38 and 40, 42 in its end portions. Apertures 36 and 38 are transversely aligned along an axis which is rotated 90° from the axis along which apertures 40 and 42 are aligned. This causes the water which enters one end of the device to make a 90° turn about the longitudinal axis before it exits from the opposite end.

Inner casing 34 is centered within ferrous intermediate casing 32 by means of a pair of rings or sleeves 44 and 46, which are positioned around opposite ends 48 and 50 of inner casing 34, and are tightly compressed between inner casing 34 and intermediate casing 32. Sleeves 44 and 46 have a relatively high coefficient of elasticity and may be made of nylon, Teflon, or any other material which is non-magnetic, i.e. has a very low magnetic permeability, and has sufficient elasticity to generate the frictional forces required to prevent casings 34 and 32 from shifting longitudinally relative to each other, under normal use conditions. In a preferred form of the invention, sleeves 44 and 46 are made of Delrin, which is an acetal resin produced by E. I. Du- Pont de Nemours & Co. Delrin sleeves of this type are available from Essex Wire Corporation, Columbia City, Ind., and other sources. As illustrated, sleeves 44 and 46 have chamfered external surfaces 45 and 47, which facilitates their insertion during manufacturing. The ends 48 and 50 of casing 34 may be flared outwardly against sleeves 44 and 46 thereby compressing them further and providing means for preventing their sliding off inner casing 34. Inner casing 34 is spaced from ferrous intermediate casing 32 by sleeves 44 and 46 so as to form therebetween an annular chamber 52, which is in fluid communication with inlet 54 and outlet 56 through apertures 36, 38 and 40, 42, respectively.

Retained within inner casing 34 is an elongated permanent magnet 58, preferably having a composition of cobalt, nickel, aluminum, copper and iron, and is magnetized along its longitudinal axis to have a plurality of longitudinally spaced-apart poles of alternating polarity represented by the symbols "N" and "S". Magnet 58 is substantially homogeneous in composition and, in the embodiment illustrated, comprises two magnetic domains extending transversely throughout the magnet and having their magnetic moments oppositely aligned such that alternate North and South poles exist along the length of the magnet. A magnet such as this may be produced by imposing on a bar of magnetic material two longitudinally displaced static magnetic fields of opposite polarity. The number of poles for a particular magnet depends to a great extent on the size of the device and of the gallon per hour capacity, so that in the case of a very small capacity device, a magnet having only two poles may be the most efficient.

Magnet 58 is provided with a pair of resilient plastic end caps 60 and 62, which are compressed between it and inner casing 34 so as to frictionally retain magnet 58 in place. End caps 60 and 62 are of a non-magnetic material and additionally serve to space magnet 58 from inner casing 34 thereby magnetically insulating it.

The structure described above is designed to concentrate the magnet field produced by magnet 58 in the annular chamber 52 immediately adjacent thereto and at the same time insulate this field from the supporting structure and any external ferromagnetic objects which may come into contact with the device. Due to the high permeability of intermediate casing 32, the flux produced by magnet 58 will extend radially outward therefrom, pass through casing 34 and return to magnet 58 without straying from chamber 52. By thus containing the magnetic field, maximum efficiency in subjecting the water flowing through the device to the magnetic field is achieved. Containment of the magnetic field is further enhanced through the use of non-magnetic materials for the outer casing 10, fittings 12 and 14 and sleeves 44 and 46. Plastic end caps 60 and 62 assist in preventing premature magnetic shorting of the field due to its passing through chamber 52.

As mentioned previously, although the frictional forces between the end caps 60 and 62 and inner casing 34 and between sleeves 44 and 46 and inner casing 34 are adequate to prevent axial shifting of the internal elements for the water conditioner during normal use, dropping the device on its end during shipping or installation may cause one of the sets of apertures 36, 38 or 40, 42 to become partially or completely blocked. This may be caused by the magnet structure shifting axially over one of the sets of apertures 36, 38 and 40, 42, or by the sleeves 44 or 46 shifting axially with respect to inner casing 34, which would also cause partial or complete blockage of the apertures 36, 38 or 40, 42.

To prevent this from happening, the present invention provides means whereby inwardly and outwardly projections are provided on the inner and outer surfaces 64 and 66 of inner casing 34. This may be accomplished by inserting a rod-like tool 66 (FIG. 8) in apertures 36, 38, 40 and 42 in each end of inner casing 34, and then rotating the tool 66 toward the longitudinal axis of the device such that apertures 36 and 40 are deformed to form an inwardly projecting ear 68 and an outwardly projecting ear 70. Depending on the amount of pressure used, the apertures will be either bent or partially torn, but, in any event, will project beyond the rest of the surface 64 or 66 of inner casing 34.

As can be seen more clearly from FIG. 1, inwardly projecting ears 68 will function as positive retaining means for the end cap enclosed ends of magnet 58 thereby preventing its shifting axially within inner casing 34. Similarly, outwardly projecting ears 70 will provide a positive stop against sleeves 44 and 46 thereby preventing them from shifting axially inward with respect to inner casing 34. Since the ends of inner casing 34 are flared outwardly, sleeves 44 and 46 will not be able to move relative to inner casing 34.

Although alternative means may be provided for preventing the movement of magnet 58 and sleeves 44 and 46 relative to inner casing 34, such as forming pips on the inner surface 64, the technique outlined above has proven, thus far, to be the most cost effective. An additional advantage to providing the locking means in this manner is that the apertures 36, 38, 40 and 42 are shaped such that they form deflector surfaces which tend to scoop the incoming water into annular chamber 52 and then scoop the water out of chamber 52 toward outlet 56. It is believed that this provides an easier flow path for the liquid and, therefore, less pressure drop, than in the case where the water must make two right angle turns before it begins to flow in chamber 52. For this reason, it is desirable to deform all of the apertures 36, 38, 40 and 42, rather than just one on each end of inner casing 34. For locking purposes, however, only one aperture on each end need be deformed.

In use, the device is connected within a water line supplying the apparatus in which scale buildup is prevented by means of compression fittings 28 and 30. Obviously, other types of fittings may be employed depending on the particular application. As indicated by arrows in FIG. 1, the water flows through inlet 54 and apertures 36 and 38 into annular chamber 52 wherein it is subjected to the magnetic field produced by magnet 58, and from then it flows through apertures 40 and 42 and outlet 56.

In an exemplary form of the present invention, outer casing 10 is made of copper and fittings 12 and 14 are brass. Casing 32 is a threaded, galvanized one-half inch steel pipe with an inner diameter of 0.633 in. and inner copper casing 34 has an outer diameter of 0.500 in. and an inner diameter of 0.400 in. Delrin sleeves 44 and 46 are 0.250 in. in length, have an outer diameter of 0.687 in. and an inner diameter of 0.500 in. Magnet 58 is 0.375 in. in diameter, 6 in. in length and the pole spacing is 1.75 in. End caps 60 and 62 are 0.005 in. thick.

The device is assembled in the following manner. End caps 60 and 62 are first pressed over opposite ends of magnet 58 and this assembly, which has a larger diameter than the inner diameter of inner casing 34 due to caps 60 and 62, is pressed inside casing 34. Tool 66 is then inserted in each of the apertures 36, 38, 40 and 42 and pulled downwardly as illustrated in FIG. 8 thereby bending a portion of the perimeter of each of the apertures 36, 38, 40 and 42 inwardly to form locking ears 38 and a portion of the other end of each of the apertures 36, 38, 40 and 42 outwardly to form locking ears 70.

Casing 34 is then inserted within ferromagnetic casing 32, which has the same length as inner casing 34, and the tapered Delrin sleeves are wedged between casings 32 and 34 at the ends thereof. The inner diameter of casing 32 is slightly smaller than the outer diameter of Delrin sleeves 44 and 46, but the tapered surfaces of the sleeves 44 and 46 permit insertion without sacrificing the tight fit between them and casings 32 and 34. After sleeves 44 and 46 are in place, the ends 48 and 50 of inner casing 34 are flared outwardly so that sleeves 44 and 46 fit tightly on casing 34. Outer casing 10 has been placed over casing 32 and the fittings 12 and 14 are screwed onto casing 32. The threaded portions 72 and 74 of casing 32 are tapered slightly so that as fittings 12 and 14 are screwed thereon, it has a tendency to narrow slightly in diameter thereby clamping sleeves 44 and 46 even more tightly.

Although the device has been shown and described as having an overall shape which is symmetrical about a straight axis, it should be noted that other configurations are not excluded. Furthermore, magnet 58 is preferably made of a material having a high energy product and high retentivity and coercivity, such as an Alnico material. While intermediate casing 32 is preferably made of galvanized iron or steel, it may be of any material having good ferromagnetic properties and high permeability, which provides a good path for completing the magnetic circuit produced by magnet 58, thereby concentrating the magnetic field within annular chamber 52.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A device for the treatment of water comprising:
an elongated tubular intermediate casing of magnetic material, said casing having an inner surface,
an elongated magnet having opposite ends and at least two axially spaced poles,
an inner casing of non-magnetic material encasing said magnet, said inner casing including inner and outer surfaces extending longitudinally with respect thereto,
said inner casing including open tubular end portions extending beyond opposite ends of said magnet,
said inner casing and magnet being positioned longitudinally within said intermediate casing,
means for supporting said inner casing within said intermediate casing and spacing said inner casing from said intermediate casing surface so as to form an annular chamber therebetween, said means for supporting comprising a pair of tapered elastic sleeves of non-magnetic material being positioned over opposite ends of said inner casing between said inner casing outer surface and said intermediate casing inner surface,
the ends of said inner casing being flared outwardly so as to tightly compress said sleeve between the flared ends of said inner casing and the inner surface of said intermediate casing, said sleeves being in tight frictional engagement with said intermediate casing and the flared ends of said inner casing,
an aperture in each of said tubular end portions extending into said annular chamber,
inwardly projecting locking means on the inner surface of said inner casing respectively positioned between said magnet and said apertures for limiting relative axial movement between said magnet and said inner casing, and outwardly projecting locking means on the outer surface of said inner casing between respective said sleeves and said apertures for limiting relative axial movement between said inner casing and said sleeves,
each of said apertures having a first end and a second end spaced axially outward from said first end,
said inwardly projecting locking means comprising inwardly deformed portions of the perimeters of said aperture first ends forming inwardly projecting locking ears,
said outwardly projecting locking means comprising outwardly deformed portions of the perimeters of said aperture second ends forming outwardly projecting locking ears, and
a fluid inlet fitting secured to one end of said intermediate casing and a fluid outlet fitting secured to the other end of said intermediate casing.

2. The device of claim 1 including an outer tubular casing of non-magnetic material positioned around said intermediate casing.

3. The device of claim 1 wherein said fluid fittings are integral units of non-magnetic material threadedly secured to opposite ends of said intermediate casing and include reduced diameter adapter portions coaxial with said magnet.

4. The device of claim 1 wherein said magnet is magnetized along its longitudinal axis and comprises at least two adjacent magnetic domains positioned along its longitudinal axis which extend transversely throughout said magnet and have opposing magnetic moments such that there exists at least three longitudinally spaced apart sections of alternate North and South polarity.

5. A device for the magnetic treatment of water comprising:
an elongated tubular intermediate casing of magnetic material, said casing having an inner surface,
an elongated magnet having at least two axially spaced poles,
an inner casing of non-magnetic material encasing said magnet, said inner casing including inner and outer surfaces,
said inner casing including open tubular end portions extending beyond opposite ends of said magnet,
said inner casing and magnet being positioned longitudinally within said intermediate casing,
sleeve means for supporting said inner casing within said intermediate casing and spacing said inner casing from said intermediate casing inner surface so as to form an annular chamber therebetween,
an aperture in each of said tubular end portions extending into said annular chamber, each of said apertures having a first end and a second end spaced axially outward from the respective first end, the first end of one of said apertures including fluid deflector surface means projecting inwardly from the inner surface of said inner casing for scooping incoming liquid into said annular chamber, the second end of the other aperture including fluid deflector surface means projecting outwardly from the outer surface of said inner casing for scooping liquid in said annular chamber into the respective tubular end portion, the second end of said one aperture including a fluid deflector surface means for guiding liquid into said annular chamber, the first end of the other aperture including fluid deflector surface means for guiding liquid into the respective tubular end portion, and fluid inlet and outlet fittings connected to opposite ends of said intermediate casing.

6. The device of claim 5 wherein said fluid deflector surface means each comprises a deformed portion of the perimeter of the respective aperture which is deformed in the radial direction relative to the axis of the device.

7. A device for the treatment of water comprising:

an elongated tubular intermediate casing of magnetic material, said casing having an inner surface, an elongated magnet having opposite ends and at least two axially spaced poles, an inner casing of non-magnetic material encasing said magnet, said inner casing including inner and outer surfaces extending longitudinally with respect thereto, said inner casing including open tubular end portions extending beyond opposite ends of said magnet, said inner casing and magnet being positioned longitudinally within said intermediate casing, means for supporting said inner casing within said intermediate casing and spacing said inner casing from said intermediate casing inner surface so as to form an annular chamber therebetween, said means for supporting comprising a pair of tapered elastic sleeves of non-magnetic material being positioned over opposite ends of said inner casing between said inner casing outer surface and said intermediate casing inner surface, the ends of said inner casing being flared outwardly so as to tightly compress said sleeve between the flared ends of said inner casing and the inner surface of said intermediate casing, said sleeves being in tight frictional engagement with said intermediate casing and the flared ends of said inner casing, an aperture in each of said tubular end portions extending into said annular treatment chamber, each aperture having a first end and a second end spaced axially outward of the respective first end, said inwardly projecting locking means comprising a portion of the tubular end portion at the perimeter of the first end of one of the apertures being deformed radially inwardly and shaped as a fluid deflector surface to scoop liquid into the annular chamber, and said inwardly projecting locking means further comprising a portion of the tubular end portion at the perimeter of the first end of the other aperture being deformed radially inwardly and shaped as a fluid guide surface to guide liquid out of the annular chamber, said outwardly projecting locking means comprising a portion of the tubular end portion at the perimeter of the second end of said one aperture being deformed radially outwardly and shaped as a fluid guide surface to guide liquid into the annular chamber, said outwardly projecting locking means further comprising a portion of the tubular end portion at the perimeter of the second end of said other aperture being deformed radially outwardly and shaped as a fluid deflector surface to scoop liquid out of the annular chamber.

* * * * *